United States Patent Office 2,872,412
Patented Feb. 3, 1959

2,872,412

PROCESS FOR THE FINISH SWEETENING OF MERCAPTAN-CONTAINING PETROLEUM HYDROCARBONS WITH AIR AND CAUSTIC ALKALI TREATED CHARCOAL

Eric McNeill, Sunbury-on-Thames, and Brian Robson, Cheltenham, England, assignors to The British Petroleum Company Limited, London, England, a British joint-stock corporation No Drawing. Application May 17, 1955
Serial No. 509,112

Claims priority, application Great Britain May 21, 1954

3 Claims. (Cl. 208—203)

This invention relates to the sweetening of mercaptan-containing petroleum or other hydrocarbons; by sweetening is meant a process for conversion of mercaptans to disulphides whereby the total sulphur content of the hydrocarbons remains unchanged.

It is known that mercaptan-containing hydrocarbons can be sweetened by admixture in liquid phase and in the presence of air with a caustic alkali solution containing powdered charcoal but the continuous operation of such a process presents certain problems in securing adequate contact and subsequent separation. It is also known that mercaptans may be extracted from hydrocarbon liquids by passing them in absence of air through a bed of charcoal previously soaked in caustic alkali solution. The mercaptans are adsorbed on the charcoal bed which consequently requires frequent regenerating or renewal.

The principal object of the present invention is to provide a sweetening process for mercaptan-containing hydrocarbons which can be operated for long periods without attention in simple mild steel equipment at or near the atmospheric temperature prevailing. More especially the present invention is designed to provide a cheap and easy method whereby light gasolines, from which the most part of the mercaptans have previously been extracted with caustic alkali solutions, or caustic alkali solutions containing solubilising agents such as cresylic acid, may be rendered mercaptan free as judged by the so-called doctor test. The presence of cresylic acids and/or phenols associated with hydrocarbons in minute traces in the oils so sweetened does not appear to affect the process of the invention.

According to the invention, a process for sweetening a mercaptan-containing hydrocarbon feedstock comprises dissolving oxygen in the feedstock and passing it through a contact bed of charcoal containing absorbed or adsorbed aqueous caustic alkali solution.

The contact bed may be prepared by soaking the charcoal in aqueous caustic alkali solution and allowing excess caustic alkali solution to drain off. For example, the contact bed may be prepared by charging an empty mild steel reactor with granular charcoal (a suitable size being that between 8 and 44 mesh BSS), the bed being supported by a gauze of stainless steel or other suitable means, and pumping a charge of aqueous caustic soda solution, preferably of concentration about 10% w./v., into the reactor to submerge the charcoal. After two hours, the caustic soda solution may be drained to storage and, suitably fortified, it may be re-used for the same purpose on other occasions.

Any convenient means may be used for dissolving oxygen in the feedstock. For example the feedstock may be subjected to elevated air or oxygen pressure, or air or oxygen may be bubbled through the feedstock, or eductors may be used. The presence of undissolved air or oxygen in the feedstock is to be avoided since the presence of bubbles tends to disturb or form channels through the bed. The feedstock should preferably be passed upwardly through the bed since any tendency for droplets of caustic alkali solution to be lost is thereby lessened.

The treatment may be continued until the contact bed loses its activity for sweetening, i. e. until the product flowing from the reactor is no longer doctor negative, at which time a fresh bed may be brought into action to complete the sweetening. By use of a number of reactors in series economy in use of charcoal may be obtained since at the time when the effluent from a bed runs positive to the doctor test, that particular bed retains considerable powers of converting mercaptans to disulphides. When the time comes for a bed to be taken out of service, it may be regenerated by blowing with superheated steam or superheated steam and air in situ or may be removed and reactivated in a furnace at temperatures in the range 500–1000° C. using mixtures of steam, inert gas and air. The hydrocarbons may be advantageously passed through the contact bed at space velocity over the range 0–20 v./v./hr.

It is believed that in passing through the bed of charcoal soaked in caustic alkali solution the peculiar physical configuration of the surface of the charcoal imposes a degree of propinquity on adjacent mercaptide molecules such that the latter readily form disulphides which at once dissolve in the passing hydrocarbon stream. The sodium ions in the presence of oxygen and water reform sodium hydroxide. There is therefore formation of water but no alteration in the quantity of sodium hydroxide present. By arranging that the hydrocarbon stream does not become fully saturated with water in the reactor any water formed by the reaction may be continuously removed by the hydrocarbon stream.

The invention is illustrated by the following:

*Example 1*

A gasoline of boiling range between 80 and 160° C. distilled from a Middle Eastern crude oil and containing dissolved air and 0.019% wt. mercaptan sulphur was passed upwards through a bed of activated charcoal previously soaked in 10% w./v. caustic soda solution at a rate of 15 v./v./hr. Before the treated gasoline tested positive to the doctor test, the charcoal had sweetened 1800 times its own weight of gasoline (16,000 bbl. gasoline per ton of charcoal). The run was continued until gasoline equivalent to 2900 times the bed weight had been processed. By this time the mercaptan content of the final gasoline runnings had only reached 0.0004% wt. mercaptan sulphur.

*Example 2*

A kerosine of boiling range between 160 and 240° C. distilled from a Middle Eastern crude oil and containing dissolved air and 0.015% wt. mercaptan sulphur was passed upwards through a bed of activated charcoal previously soaked in 10% w./v. caustic soda solution at a rate of 5 v./v./hr. Before the treated kerosine tested doctor positive the charcoal had sweetened 280 times its own weight of gasoline (2240 bbl./ton).

*Example 3*

A light gasoline of boiling range between 40 and 130° C. distilled from a Middle Eastern crude oil was passed through a solutizer plant in the absence of air whereby the mercaptan sulphur content was reduced from 0.02 to 0.005% wt. Air was then dissolved in the product and it was passed upwards through a bed of activated charcoal, previously soaked in 10% w./v. caustic soda solution, at a rate of 5 v./v./hr. The remaining mercaptans were converted to disulphides and the product satisfied the doctor test until the charcoal had sweetened 6450 times its own weight of gasoline (60,000 bbl./ton).

We claim:

1. A process for the sweetening of a mercaptan-containing liquid hydrocarbon feedstock comprising extracting the most part of the mercaptans from the feedstock by contacting same with a caustic alkali solution to render the feedstock mercaptan-free as judged by the so-called doctor test, finish sweetening the treated feedstock by dissolving oxygen in the treated feedstock, and passing solely the oxygenated feedstock through a contact bed of charcoal which has been soaked in aqueous caustic alkali solution and the excess caustic alkali solution allowed to drain off, said feedstock being passed through said contact bed at a space velocity sufficient to prevent the feedstock from becoming fully saturated with water and not in excess of 20 v./v./hr.

2. A process according to claim 1, in which the feedstock is a gasoline which is positive to the doctor test.

3. A process according to claim 1 wherein the oxygenated feedstock is passed in series through a plurality of reactors, each containing a bed of charcoal which has been soaked in an aqueous caustic alkali solution.

References Cited in the file of this patent

UNITED STATES PATENTS

| | | |
|---|---|---|
| 1,957,794 | Morrell et al. | May 8, 1934 |
| 2,098,059 | Morrell | Nov. 2, 1937 |
| 2,102,796 | Happel et al. | Dec. 21, 1937 |
| 2,427,250 | Bond | Sept. 9, 1947 |
| 2,577,824 | Stine | Dec. 11, 1951 |
| 2,748,059 | Nixon et al. | May 29, 1956 |